(12) United States Patent
Reed et al.

(10) Patent No.: US 7,917,407 B1
(45) Date of Patent: Mar. 29, 2011

(54) COMPUTER-IMPLEMENTED SYSTEM AND METHOD FOR DEFINING ARCHITECTURE OF A COMPUTER SYSTEM

(75) Inventors: Eugene R. Reed, Warrensburg, MO (US); Chris Saunderson, Kansas City, MO (US)

(73) Assignee: Sprint Comminications Company L.P., Overland Park, KS (US)

( * ) Notice: Subject to any disclaimer, the term of this patent is extended or adjusted under 35 U.S.C. 154(b) by 1665 days.

(21) Appl. No.: 11/175,421

(22) Filed: Jul. 6, 2005

(51) Int. Cl.
*G06Q 30/00* (2006.01)

(52) U.S. Cl. ............... 705/26.62; 705/26.61; 705/26.63; 705/26.64; 705/26.5; 705/26.7

(58) Field of Classification Search ............... 705/26, 705/27
See application file for complete search history.

(56) References Cited

U.S. PATENT DOCUMENTS

| | | | |
|---|---|---|---|
| 2004/0064472 A1* | 4/2004 | Oetringer et al. | 707/102 |
| 2004/0128263 A1* | 7/2004 | Dosanjh | 705/400 |
| 2005/0137918 A1* | 6/2005 | Joodi | 705/7 |
| 2005/0235124 A1* | 10/2005 | Pomaranski et al. | 711/170 |
| 2006/0168278 A1* | 7/2006 | Lazen et al. | 709/230 |
| 2008/0059331 A1* | 3/2008 | Schwab | 705/27 |

OTHER PUBLICATIONS

"A decision-tree approach to the design and implementation of accounting and information systems for small businesses." Greer, Olen L. Journal of Small Business Management, vol. 27, No. 1, p. 8(9), Jan. 1989. Retrieved Nov. 8, 2010 via Dialog.*

* cited by examiner

*Primary Examiner* — Michael A. Misiaszek (57) ABSTRACT

A method of determining a computer system is provided. The method comprises categorizing the criticality level of each application based on a business impact assessment. The method includes identifying computer system configurations for an application based on a decision tree and on the criticality level of the application. The method also includes providing a computer system selected based on the computer system configurations.

19 Claims, 6 Drawing Sheets

COMPUTER-IMPLEMENTED SYSTEM AND METHOD FOR DEFINING ARCHITECTURE OF A COMPUTER SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to business systems, and more particularly, but not by way of limitation, to a method and system of practicing a rules-based decision tree for reference architecture modeling.

BACKGROUND OF THE INVENTION

Enterprise software applications or computer programs are deployed or installed on a variety of computer systems. The computer systems may be provided by different manufacturers and may have been installed within the enterprise at different dates. The applications may share portions of the computer systems, for example, two or more applications may share one or more interfaces. Applications evolve over time and are deployed, installed, or fielded in different versions. In a large enterprise, a variety of different applications providing similar functionality may be deployed and in service. Different applications may be more or less vital to continuing enterprise activities, which may be captured in different criticality levels.

Developing and maintaining software and computer systems is a complex and challenging activity. It may be desirable to provide processes for developing and maintaining software and computer systems to promote repeatable, consistent, and successful project efforts. The Software Engineering Institute (SEI) has promulgated a capability maturity model which attempts to define and classify an organization's ability to develop and maintain software systems. Higher levels of capability in this model are associated with substantially optimized and consistently deployed operational processes.

SUMMARY OF THE INVENTION

According to one embodiment, a method of selecting a computer system is provided. The method comprises categorizing the criticality level of each application based on a business impact assessment. The method includes identifying computer system configurations for an application based on a decision tree and on the criticality level of the application. The method also includes providing a computer system selected based on the computer system configurations.

In another embodiment, a computer implemented system for defining an architecture of a computer system is provided. The computer implemented system comprises a first data store containing business impact assessments, each business impact assessment associated with an application. The computer implemented system also comprises a second data store containing engineering standards, the engineering standards identifying alternate computer systems for providing a specific service. An analyzer component is operable to define an architecture of a computer system to provide one or more services employed by the application based on the business impact assessment associated with the application.

In another embodiment, a method of applying reference architecture is provided. The method comprises defining a criticality level of applications. The method also includes, for each criticality level, defining one or more reference architectures for each of a plurality of services. The method also includes configuring a computer system operable to run the application and to provide the services the application uses, the computer system composed according to the reference architecture for the services that accord with the criticality level of the application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

In a large organization knowledge may not be effectively shared and system architecture and design decisions may be based on limited understanding of technical issues and/or limited understanding of past experiences within the enterprise. A method and tool for sharing a plurality of reference architectures that may be employed to achieve consistently successful system architectures and designs is presented below. A criticality level of an application is used in association with a decision tree to select an appropriate one of the several reference architectures. The reference architecture may define a complete package, including a host card configuration, an operating system version that is best practice, a monitoring tool that is best practice, a network configuration, and a back-up tool appropriate for a system. This complete package definition may integrate into a costing system and into design documentation tools that lead to a build manifest directing the complete build process for the server.

Applications may be categorized according to their criticality to the ongoing business of the enterprise. An industry standard process or a process developed within the enterprise may be employed for evaluating the criticality level of applications. An exemplary industry standard evaluation process, for example, may involve answering fifty or sixty questions from a standard questionnaire and calculating a score based on the responses to the questions. The business impact assessment process is an example. The score may be used to rank the applications of an enterprise in one to N order, where N is the number of applications. The applications may be allocated to a limited number of criticality categories based on the score derived from the questionnaire or business impact assessment process. For example, applications may be categorized, from most critical to least critical, as mission critical, business critical, enhanced standard support, and standard support. In different embodiments, other criticality categories may be identified and employed.

Applications may be assigned to criticality categories based on other analyses, for example based on service level agreements between developers and/or system operators and the users of the systems. For example, systems may be assigned a criticality level based on their minimum availability or on the maximum down time. Some applications may require a minimum of 99.9% availability, for example an enterprise billing system. Other applications may be satisfied with a best effort recovery strategy.

Knowledge of best practice server installations and what server platforms use in different circumstances can be captured in decision trees. The decision trees may be updated as technology and best practices evolve. The use of decision trees can promote standardized processes by enforcing and influencing standards. Additionally, the decision trees can provide guaranteed solutions. For example, a designer who needs a highly available server solution may be uncertain what mix of hardware and software to select to build a highly available server. The use of a decision tree may define the needed best practices highly available server.

A separate set of decision trees is provided for each of the different criticality levels of applications, because the server installations and server platform configurations may be different depending on the criticality levels of the subject application. More particularly, it may be an inefficient investment of enterprise resources to pay a premium price for a highly available system when a system with a lower availability is entirely adequate for a specific application. The decision trees may be considered to be a family of decision trees parameterized by the criticality level of the application. Alternatively, the decision trees may be considered to be a three dimensional decision tree with distinct planes associated with each criticality level. Some portions of different decision trees may be common between two or more criticality levels.

If the application has no platform specific requirements, the decision tree directs the user to a preferred platform, otherwise the decision tree directs the user to the required platform. The decision tree then directs the user to choose a specific platform configuration based on the processing load that an application is expected to bear.

Figure 1:
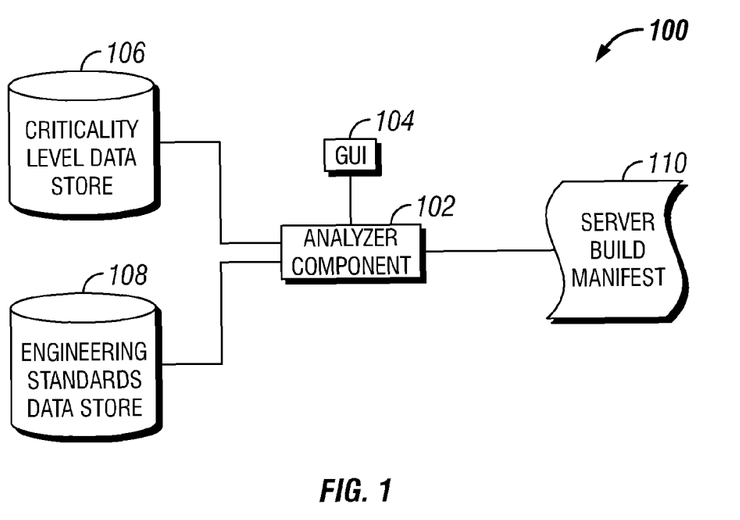
FIG. 1 is a block diagram of a system for automating decision tree based on application criticality according to one embodiment of the present disclosure.

While the decision trees based on criticality levels may be used manually, in an embodiment the decision trees are accessed using a parameterized decision tree tool. Turning now to FIG. 1, a block diagram of a system 100 that supports decision trees based on criticality levels is depicted. The system 100 comprises an analyzer component 102 that receives control inputs from a graphical user interface (GUI) 104 or other interface. Applications may be placed into one of a plurality of criticality levels either manually or using an automated tool, and this information may be captured in a criticality level data store 106. In an embodiment, a business impact assessment process or a process based on the business impact assessment process is employed to evaluate the criticality levels of applications. The analyzer component 102 accesses the criticality level data store 106 when presenting a decision tree for a selected application in the GUI 104.

An engineering standards data store 108 includes information about alternative servers and alternative configurations of servers. The information may include best practice information and configurations for servers, operating system versions, monitoring tools, network configurations, back-up tools, and other components and/or software utilities. Because best practices evolve over time, the contents of the engineering standards data store 108 is expected to be updated from time-to-time. The analyzer component 102 communicates with the engineering standards data store 108 to obtain information to be presented in a decision tree for a selected application in the GUI 104.

The decision tree displayed in the GUI 104 guides the designer and/or user to select a best practice server solution for a subject application. The analyzer 102 may interact with the engineering standards data store 108 to generate a server build manifest 110 that is adequate for ordering the server hardware and configuring the server for supporting the application.

Figure 2:
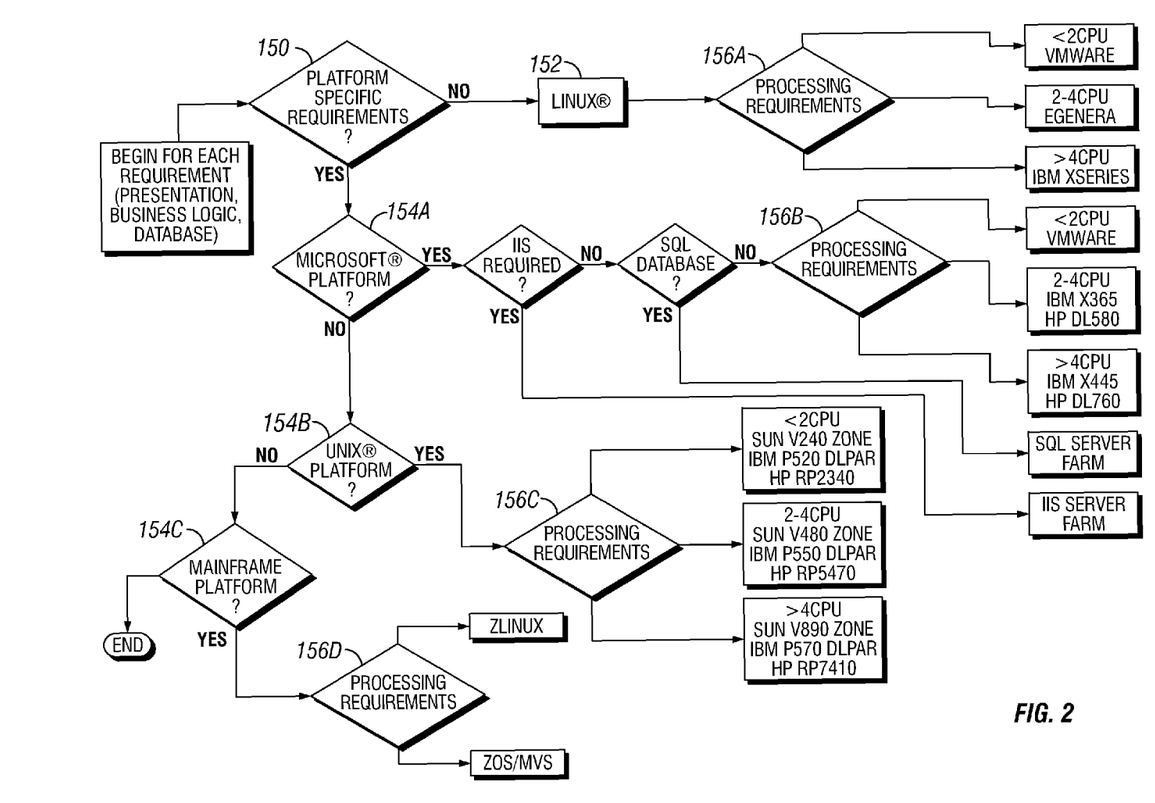
FIG. 2 illustrates a portion of an exemplary decision tree for selecting a server platform for an application according to another embodiment of the present disclosure.

Turning now to FIG. 2, an exemplary decision tree is depicted. Note that the illustrated decision tree represents a decision tree for a particular criticality level or a single plane of a multi-plane decision tree. Because processing associated with an application may be distributed, the decision tree is traversed for each high level requirement, for example for a presentation layer component of an application, a business logic component of the application, and/or a data store component of the application. At block 150, the decision tree asks the user to indicate if any platform specific requirements exist. If no platform specific requirements exist, the decision tree directs the user to a default platform in block 152. In the exemplary decision tree, the default platform is indicated to be Linux®, but in other embodiments other platforms may be designated as the default platform. Additionally, the default platform may change over time, as technology evolves. If platform specific requirements do exist, the decision tree directs the user to the appropriate platform, for example a Microsoft® platform in block 154A, a Unix® platform in block 154B, or a mainframe platform in block 154C.

The decision tree directs the user to a processing requirements decision block 156 that is appropriate for the selected platform. The decision blocks 156A, 156B, 156C, 156d lead the user to choose between two or more processing capacity models. For example, the processing capacity models may include less than two central processing units (CPUs), from two to four CPUs, and greater than four CPUs. When the user selects a processing capacity model, the decision flow terminates and results in identifying a best practice server and server installation and/or configuration.

Note that Microsoft®, Linux®, Unix®, IBM®, HP®, VMWare®, Egenera®, and Sun® are trademarks owned by their respective companies. These systems are noted as exemplary, and others may be used or substituted or other system may be used in the future.

Figure 3:
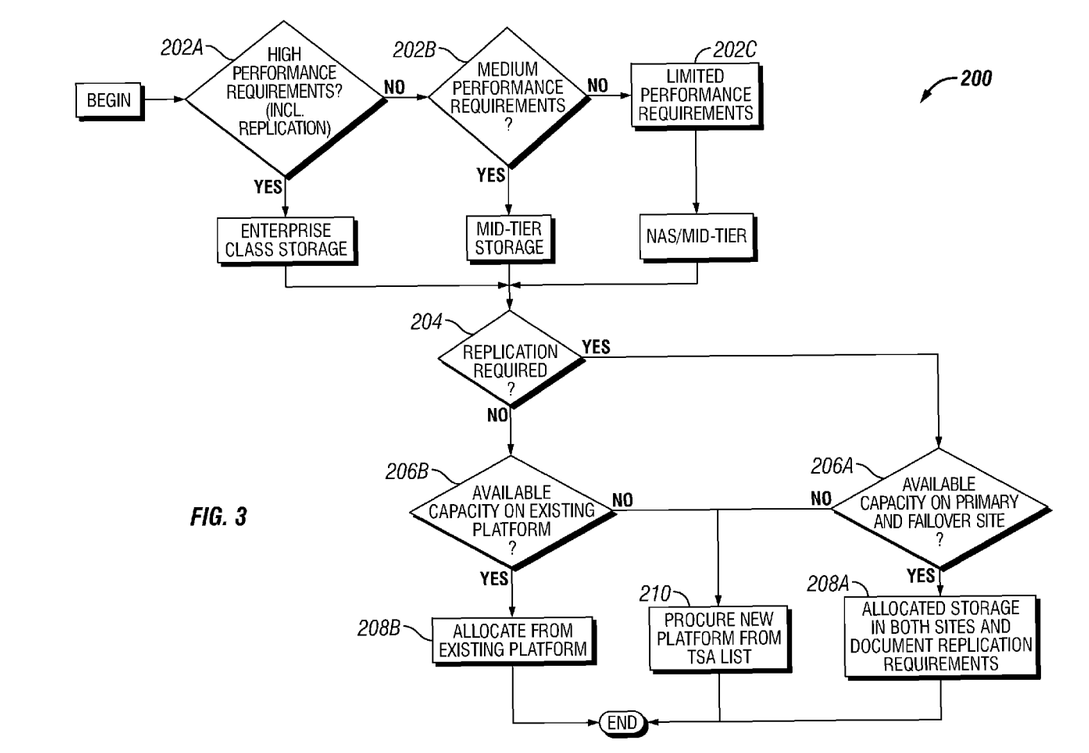
FIG. 3 illustrates an exemplary decision tree for selecting disk storage to support an application according to another embodiment of the present disclosure.

Turning to FIG. 3, an exemplary decision tree 200 for selecting disk storage for an application is depicted. In blocks 202A, 202B, 202C, a processing capacity of the subject application is used to select a best practices disk storage mechanism that is suited to the processing load of the subject application.

The decision tree block 204 leads the user to determine if data replication is required by the subject application. In decision blocks 206A, 206B, the decision tree is used to determine if available data storage capacity exists to support the subject application. If sufficient data storage capacity does not exist, the user is directed by block 210 to procure a data storage platform from the target state architecture (TSA) list. The TSA list is a list of preferred data storage platforms and other preferred computer system components. If sufficient data storage capacity does exist, the user is directed, by blocks 208a, 208b, to allocate data storage on the existing data storage platform or platforms.

Figure 4A:
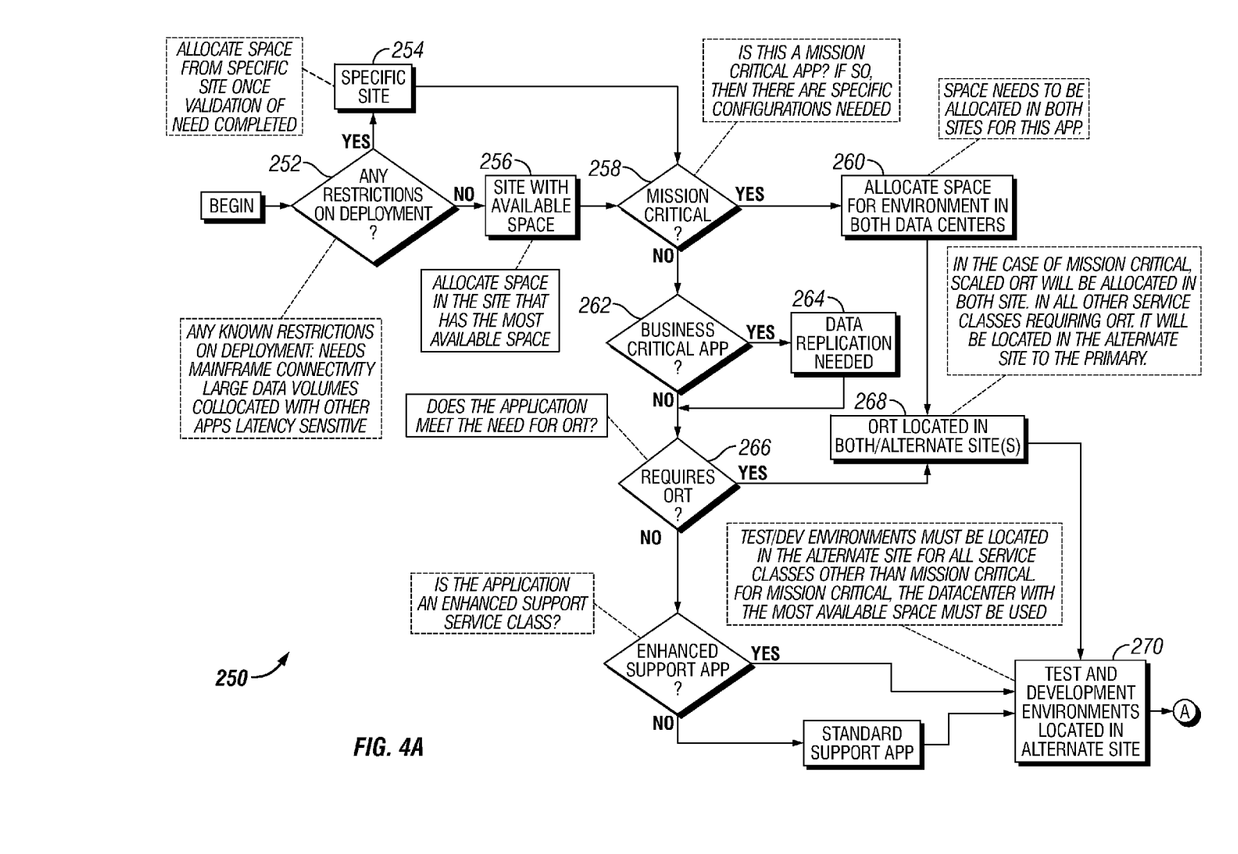
FIG. 4A and FIG. 4B illustrate an exemplary decision tree for selecting facilities in which to host an application according to another embodiment of the present disclosure.
Figure 4B:
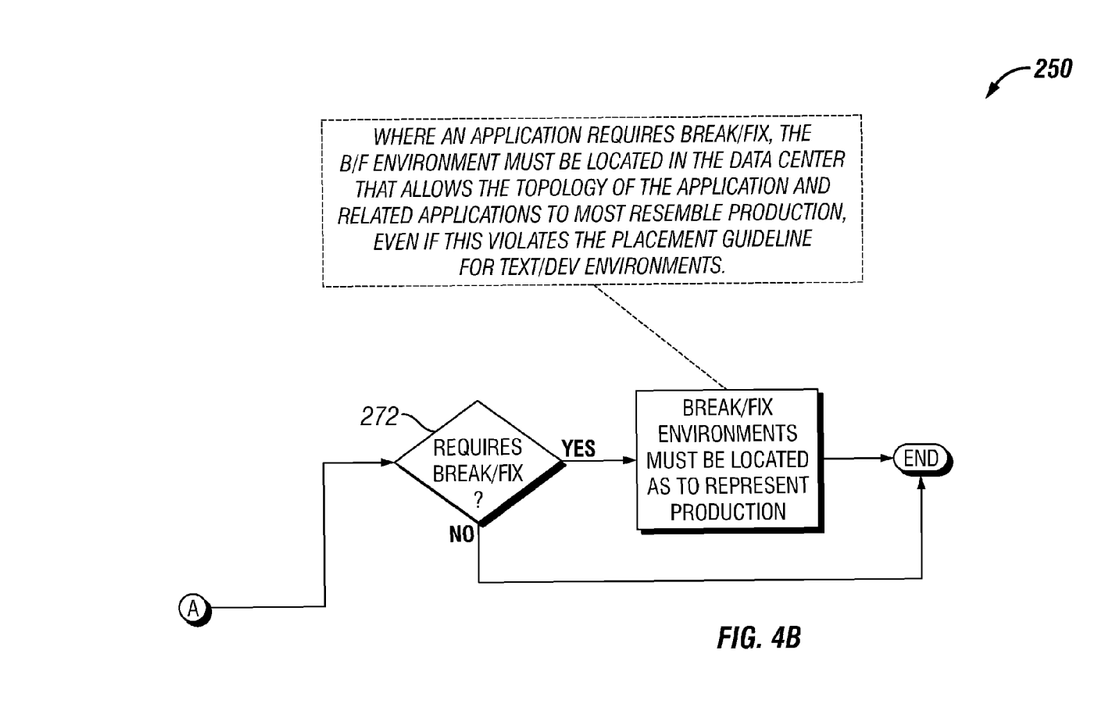

Tuning now to FIG. 4A and FIG. 4B, an exemplary decision tree 250 for selecting facilities at which to base applications is depicted. In block 252, the user determines if any restrictions on the site location for the application apply. Considerations in making this decision may include determining if the subject application generates or receives large data volumes, is collocated with other applications, or is latency sensitive. If the application has deployment restrictions, the user is directed to block 254 and allocates space for the application from a specific site, otherwise the user is directed to block 256 and allocates space for the application in the site that has the most available space. In block 258, if the application is categorized to be mission critical, the user is directed to block 260 where space is allocated in two separate locations. In the case of mission critical applications, alternate space is reserved on computing platforms or servers to run the application in the event the primary server executing the subject mission critical application fails. In the case that the subject application is categorized to be business critical at block 262, the user is directed to block 264 which denotes that data replication is required for business critical applications.

In block 266, the user is directed to decide if operational readiness test (ORT) is required for the subject application. If the subject application is mission critical or if operational readiness test is required, the user is directed to block 268 where capacity is reserved for the operational readiness test on an appropriate computing platform or server. In the case of mission critical applications, capacity for operational readiness test is reserved in both the primary and the secondary site locations. In the case of other applications, capacity for operational readiness test is reserved in the secondary site location.

In block 270, test and development environments are located in the secondary or the alternate site. In block 272, if an environment is required to be established to support duplicating problems and determining a fix, which may be referred to as a break/fix environment, the break/fix environment is located so as to provide a realistic duplication of the target environment.

The decision tree planes illustrated in FIG. 2, FIG. 3, and FIG. 4 are exemplary. In different embodiments, different decision trees may be employed. Additionally, the content of a decision tree may be expected to evolve as the technology and as best practices evolve.

Figure 5:
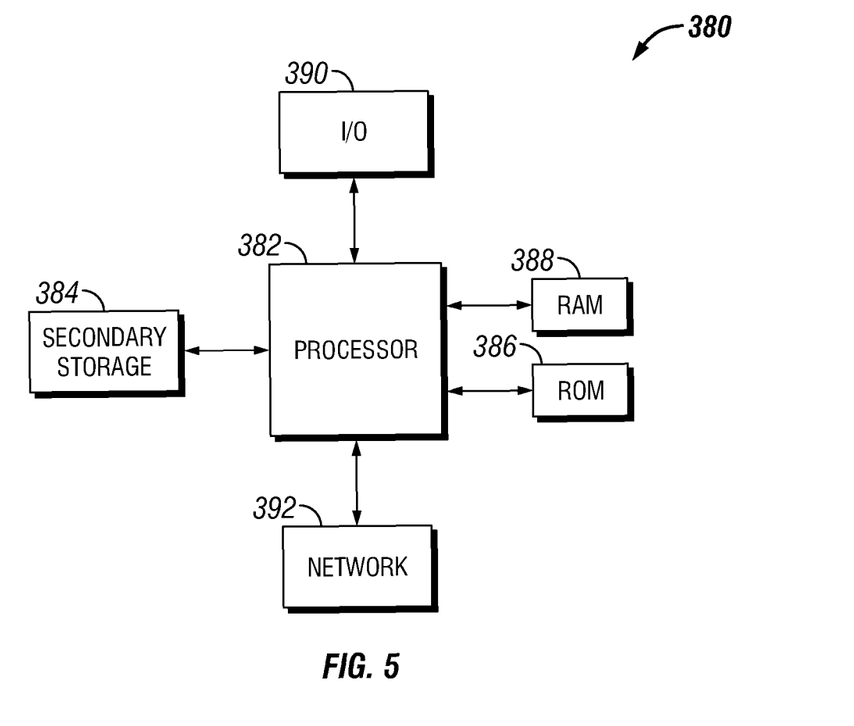
FIG. 5 illustrates an exemplary general purpose computer system suitable for implementing the several embodiments of the disclosure.

The system 100 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented method of selecting a computer system, comprising:
    categorizing a criticality level of a first application based on a business impact assessment;
    selecting, by an analyzer component stored on a computer readable non-transitory storage medium and executable by a processor, a first one of a plurality of decision trees for the first application based on the criticality level of the first application, wherein the first one of the plurality of decision trees comprises a plurality of queries to identify one or more computer system configurations for the first application, and wherein each of the plurality of decision trees comprises at least one different query;
    identifying based on answers to the plurality of queries in the first one of the plurality of decision trees the one or more computer system configurations for the first application;
    providing a computer system selected based on the one or more computer system configurations for the first application;
    categorizing a criticality level of a second application based on a business impact assessment, wherein the criticality level of the second application is different from the criticality level of the first application;
    selecting, by the analyzer component, a second one of the plurality of decision trees for the second application based on the criticality level of the second application, wherein the second one of the plurality of decision trees for the second application is different from the first one of the plurality of decision trees for the first application, and wherein the second of the plurality of decision trees comprises a plurality of queries to identify one or more computer system configurations for the second application;
    identifying based on answers to the plurality of queries in the second of the plurality of decision trees the one or more computer system configurations for the second application; and
    providing a computer system selected based on the one or more computer system configurations for the second application.

2. The computer-implemented method of claim 1, wherein the criticality level of both the first and second application is selected from the group consisting of mission critical, business critical, enhanced support, and standard support.

3. The computer-implemented method of claim 1, wherein the plurality of queries in each decision tree includes queries regarding services the computer system uses, the services selected from the group consisting of presentation services, business logic services, security services, communication services, and data store services.

4. The computer-implemented method of claim 1, wherein the first one of the plurality of decision trees includes information based on a processing load presented by the first application.

5. The computer-implemented method of claim 1 wherein the categorizing the criticality level of the first application is further based on a maximum service outage interval associated with the first application.

6. The computer-implemented method of claim 1 wherein the first one of the plurality of decision trees includes information based on an operating system.

7. The computer-implemented method claim 1, further including generating a build manifest and wherein providing the computer system selected based on the one or more computer system configurations for the first application is based on the build manifest.

8. A computer implemented system for defining an architecture of a computer system, comprising:
    a first data storage device containing a plurality of business impact assessments, each business impact assessment associated with an application;
    a second data storage device containing engineering standards, the engineering standards identifying alternate computer systems for providing a specific service;
    an analyzer component operable to present a first of a plurality of decision trees for a first application based on the business impact assessment associated with the first application, wherein the first of the plurality of decision trees comprises a plurality of queries to define an architecture of a computer system to provide one or more services employed by the first application, wherein each of the plurality of decision trees comprises at least one different query, and wherein based on answers to the plurality of queries in the first of the plurality of decision trees the architecture of the computer system to provide the one or more services employed by the first application is identified; and
    the analyzer component further operable to present a second of the plurality of decision trees for a second application based on the business impact assessment associated with the second application, wherein the business impact associated with the second application is different from the business impact assessment associated with the first application, wherein the second of the plurality of decision trees for the second application is different from the first of the plurality of decision trees for the first application, wherein the second of the plurality of decision trees comprises a plurality of queries to define an architecture of a computer system to provide one or more services employed by the second application, and wherein based on answers to the plurality of queries in the second of the plurality of decision trees the architecture of the computer system to provide the one or more services employed by the second application is identified.

9. The system of claim 8, wherein the business impact assessment associated with each application is used to generate a ranking of the applications with respect to the importance of each application and the analyzer component presents the first of the plurality of decision trees based on the ranking of the first application.

10. The system of claim 9, wherein the ranking of the applications is employed to categorize a criticality level of each application and the analyzer component presents the first of the plurality of decision trees based on the criticality level of the first application.

11. The system of claim 10, wherein the criticality levels of each application are associated with a maximum service outage interval.

12. The system of claim 10, wherein the criticality levels of each application are selected from the group consisting of mission critical, business critical, enhanced support, and standard support.

13. The system of claim 8 wherein the one or more services employed by each application are one or more of a presentation service, a business logic service, a security service, a communication service, and a data store service.

14. The system of claim 8 wherein the engineering standards further identify preferred installations of computer system components and software.

15. The computer-implemented method of claim 1, wherein each of the plurality of decision trees is associated with one criticality level.

16. The computer-implemented method of claim 1, wherein the criticality level of each application is based at least in part on the processing load presented by each application to a computer system.

17. The computer-implemented method of claim 1, further comprising obtaining, by the analyzer component, information to be presented in the first one of the plurality of decision trees for the first application from an engineering standards data store.

18. The system of claim 8 wherein each of the plurality of decision trees is associated with one criticality level.

19. The system of claim 8 wherein the analyzer component is further operable to communicate with the second data store to obtain a portion of information to be presented in each of the plurality of decision trees.

* * * * *